United States Patent [19]
Morley, Jr. et al.

[11] Patent Number: 5,113,429
[45] Date of Patent: * May 12, 1992

[54] TELEPHONE ANSWERING SERVICE WITH INTEGRATED VOICE AND TEXTUAL MESSAGE STORAGE

[75] Inventors: John F. Morley, Jr.; Kent D. Anderson, both of Madison, Wis.

[73] Assignee: American Tel-A-System, Inc., McFarland, Wis.

[*] Notice: The portion of the term of this patent subsequent to Apr. 10, 2007 has been disclaimed.

[21] Appl. No.: 484,235

[22] Filed: Feb. 23, 1990

Related U.S. Application Data

[63] Continuation of Ser. No. 251,140, Sep. 29, 1988, Pat. No. 4,916,726.

[51] Int. Cl.$^5$ .................... H04M 1/64; H04M 3/50
[52] U.S. Cl. ............................ 379/88; 379/84; 379/214; 379/218
[58] Field of Search .................. 379/88, 89, 67, 94, 379/97, 96, 214, 213, 93, 269, 284, 84, 202, 218

[56] References Cited

U.S. PATENT DOCUMENTS

| | | | |
|---|---|---|---|
| 4,523,055 | 6/1985 | Hohl et al. | 379/89 |
| 4,612,416 | 9/1986 | Emerson et al. | 379/88 |
| 4,755,932 | 7/1988 | Diedrich | 364/200 |
| 4,785,408 | 11/1988 | Britton et al. | 364/513.5 |
| 4,799,144 | 1/1989 | Parruck et al. | 364/200 |
| 4,805,207 | 2/1989 | McNutt et al. | 379/89 |
| 4,837,798 | 6/1989 | Cohen | 379/88 |
| 4,866,756 | 9/1989 | Crane et al. | 379/88 |
| 4,916,607 | 4/1990 | Teraichi et al. | 364/200 |
| 4,959,855 | 9/1990 | Daudelin | 379/213 |

FOREIGN PATENT DOCUMENTS

| | | | |
|---|---|---|---|
| 61634 | 8/1986 | Australia . | |
| 0192894 | 9/1986 | European Pat. Off. | 379/93 |

OTHER PUBLICATIONS

Phoneware 470 Technical Description copyright 1987, pp. i-v, Intro. pp. 1-7, pp. 1-29, pp. 129-130, and pp. 76-85.

Digital Research's Concurrent DOX XM Product Brief (undated).

(List continued on next page.)

*Primary Examiner*—Thomas W. Brown
*Attorney, Agent, or Firm*—Antonelli, Terry Stout & Kraus

[57] ABSTRACT

A telephone answering system for providing textual messages and voice messages generated by telephone answering of telephones of persons having telephone calls answered by the system. A system memory stores textual and voice messages. A voice message recording system controls recording of voice messages of answered telephone calls of persons having telephone calls answered by the telephone answering system. A textual message recording system controls recording of textual messages provided by an operator who answers telephone calls made to persons having their telephones answered by the telephone answering system. A programmed computer program implements the voice message recording system and the textual message recording system by execution of a program. The computer decodes a telephone number of each telephone call answered by the telephone answering system, determines a program service option to be performed in answering each telephone call based upon the decoded telephone number, causes the voice message recording system to record a voice message in the system memory if the service option is specified to be answering telephone calls by the voice message recording system, initiates ringing of an operator to cause the operator to answer the telephone call and causes the textual message recording system to record textual messages in the system memory if the service option is specified to use an operator to record textual messages in. The recording systems function to permit selective playback of individual recorded messages by the placing of a telephone call to the answering system.

19 Claims, 5 Drawing Sheets

Microfiche Appendix Included
(4 Microfiche, 296 Pages)

OTHER PUBLICATIONS

EVE® Product Brochure (undated).
EVE Priam-Redcom Software (undated).
polyForth®/32 for the M68000 Series Brochures (undated).
polyForth® for the IBM®-PC Brochures (undated).
Redcom® Publication, Mar. 1986.
Eve 68000 LE Configuration and Cost Summary, May 19, 1987.
Voicelogue TM System Features Brochure, copyright 1987.
Textlogue TM Text Mail Integration Brochure, copyright 1987.
Dialog 40 User's Guide—Dialogic Voice Communication System, May 1, 1987, pp. 1-69, and 72-100.
AMX80 Audio Multiplexer User's Guide—Dialogic Voice Communication System, Feb. 5, 1987, pp. 1-26 and Figure.
Dialogic VBASE/40-Prompt Editor Software Brochure (undated).
Dialogic Voice Mail and Custom Software Developers List, Nov. 1, 1988.
Dialogic Personal Voice Messenger TM Audio Services Window Brochure (undated).
Internal Memos dated Dec. 18, 1987, Dec. 23, 1987 and Dec. 20, 1987.
Voice Processing Newsletter, vol. 6, No. 21, Jan. 15, 1987, Cover Page, pp. 6 and 7.
Voice Processing Newsletter, vol. 6, No. 8, Apr. 15, 1987, pp. 1, 3-6, 8 and ?.
Voice Processing Newsletter, vol. 5, No. 16, Sep. 1, 1986, Cover Page, pp. ?, ? and 4.
Voice Processing Newsletter, vol. 6, No. 13, Jul. 1, 1987, Cover Page, pp. 7, 5, 7, 6 and 8.
Voice Processing Newsletter, vol. 6, No. 9, May 1, 1987, Cover Page, pp. 3 and 4.
Voice Processing Newsletter, vol. 6, No. 1, (undated), Cover Page, and p. 5.
Voice Processing Newsletter, vol. 5, No. 12, Jul. 1, 1986, Cover Page, pp. 5 and 6.
Voice Processing Newsletter, vol. 6, No. 3, Feb. 1, 1987, Cover Page, pp. 7 and 8.
Voice Processing Newsletter, vol. 4, No. 11, Nov. 1985, Cover Page, pp. 2-4.
Voice Processing Newsletter, vol. 5, No. 19, Oct. 15, 1986, Cover Page, p. ? and pp. 3 and 4.
Voice Processing Newsletter, vol. 5, No. 15, Aug. 15, 1986, Cover page, and p. 4.
The Zymacom Office Server ©1985.
Zymacom Electronic Messaging © 1985.
Zymacom PC Management Products ©1985.
Zymacom Communications Products ©1985.
The Zymacom Information Exchange ©1985.
Zymacom Automated Communications Hub © 1988.
Zach Central Server (undated).
Zach Peripherals, copyright 1988.
Zach Mail (undated).
AVE (Automated Attendant Voice Messaging/Voice Response Functions for Integration with Communications Systems), ZYMACOM, copyright 1988.
Zach Voice Server, ZYMACOM, copyright 1988.
AVA (A Cost Effective, Modular Automated Attendant Voice Messaging/Voice Response System for Small and Medium-Sized Business), ZYMACOM, copyright 1988.
Digital Research Fact Sheet FlexOS 386 ©1987.
Digital Research Fact Sheet FlexOS Multibus II Driver Pack (undated).

INDIVIDUAL SUBSCRIBER FILE

1. ACCOUNT #
2. CLIENT NAME
3. ANSWER PHRASE
4. MESSAGE FORM
5. OPERATOR PREFERENCE
6. DID #
7. # OF RINGS
8. SECURITY CODE
9. ON-OFF TIME OF SYSTEM
10. ACCOUNT INFORMATION (8 PAGES)
11. PROGRAMMED SERVICE OPTION(S)

FIG. 6

TELEPHONE ANSWERING SERVICE WITH INTEGRATED VOICE AND TEXTUAL MESSAGE STORAGE

This is a continuation application of U.S. Ser. No. 251,140, filed Sep. 29, 1988, now U.S. Pat. No. 4,916,726.

APPENDIX

Figure 3:
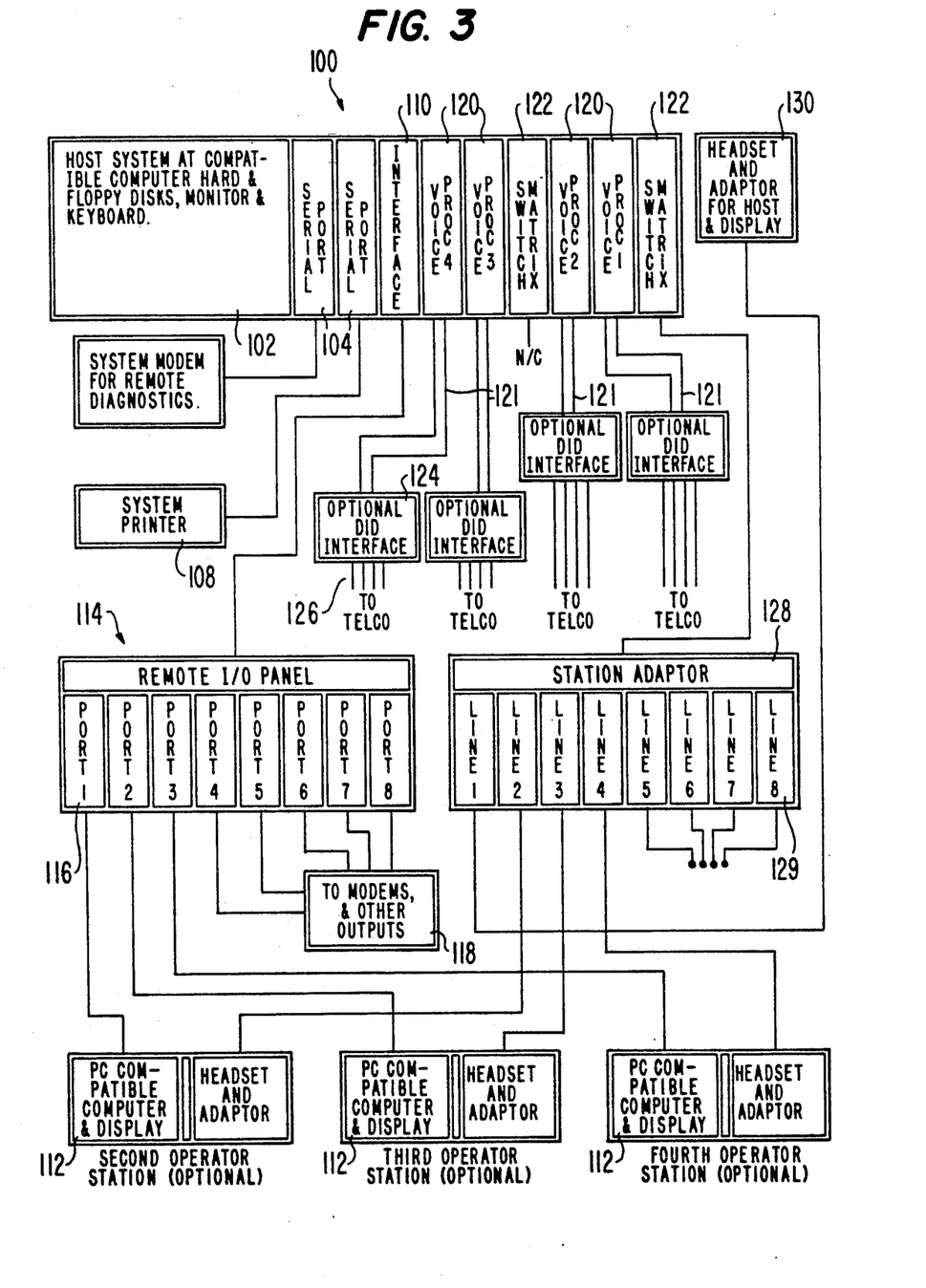
FIG. 3 illustrates a block diagram of a preferred embodiment of the present invention.

A microfiche Appendix (consisting of four microfiche and a total of 296 frames) containing a source code listing of a computer program controlling the host system AT compatible computer of FIG. 3 is attached. The Appendix contains subject matter which is copyrighted. A limited license is granted to anyone requiring a copy of the program disclosed therein for purposes of understanding or analyzing the present invention, but no license is granted to make a copy for any other purpose including the loading of a processing device with code in any form or language. The program is in polyForth ISD-4 programming language developed by Forth Inc. of Manhattan Beach, Calif.

FIELD OF THE INVENTION

The present invention relates to telephone answering systems. More particularly, the present invention relates to telephone answering systems for use by telephone answering services and private telephone switching systems.

DESCRIPTION OF THE PRIOR ART

Figure 1:
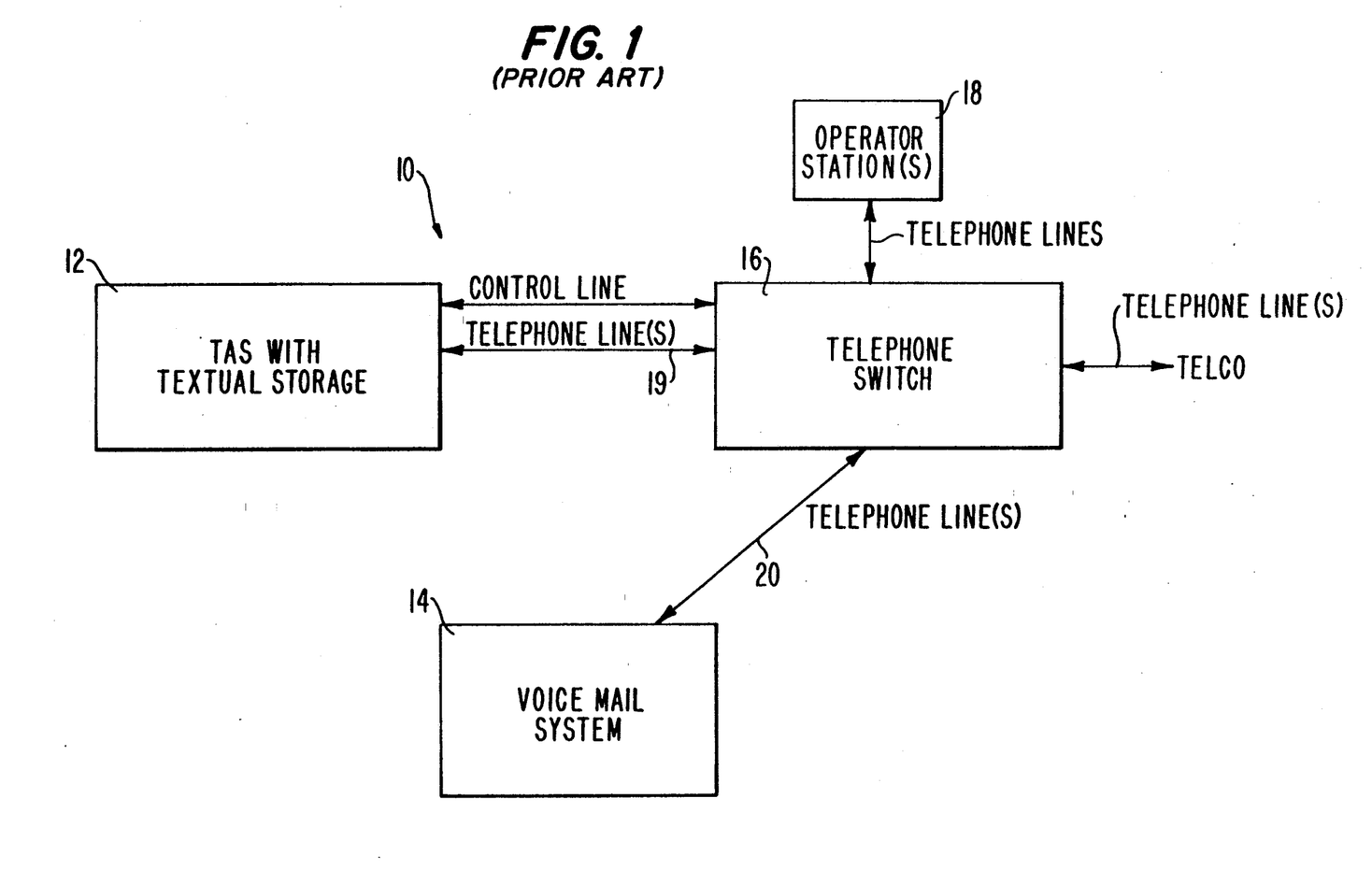
FIG. 1 illustrates a block diagram of a prior art system.

FIG. 1 illustrates a prior art system marketed by the assignee of the present invention. The prior art system 10 incorporates a telephone answering system (TAS) with textual storage 12 which was marketed by the assignee of the present invention under the trademark EVE ®. The system 12 was modified to include an add on voice mail system 14 which was connected by means of a telephone switch 16. Operator stations 18 for use by the system 12 were connected to the telephone switch 16 instead of directly to the system 12 as in commercial applications of EVE ®. The system 12 functioned as the host controller of the system 10. A subscriber of a telephone answering service using the prior art system 10 wishing to obtain voice mail service telephoned the answering service to have the subscriber's account programmed to provide either textual message answering service requiring the intervention of a live operator located at an operator station 18 to record a textual message or a voice mail message to be recorded by the voice mail system 14. The memories for the systems 12 and 14 were separate. A telephone caller to the subscriber was connected to the system 12 through the telephone switch 16. The system 12 decoded the number that was called to identify the particular subscriber of the system whose account is being serviced. The subscriber's programmed service option determined if the telephone call was to be handled through operator intervention by one of the operator stations 18 to record a textual message or alternatively if the telephone call was to be handled by a voice prompting produced by voice mail system 14 to record a voice message from the telephone caller. The activation of the voice mail system 14 to record a voice message left by a telephone caller to a subscriber of the telephone answering service required the system 12 to place a telephone call to the telephone switch 16 over low bandwidth telephone lines 19 which then connected the telephone caller to the voice mail system 14 by telephone line 20. Similarly, all communications from the voice mail system 14 to the system 12 such as when a subscriber checked in and was connected to the voice mail system and then wished to talk with an operator also required communications over telephone lines 19 and 20.

The prior art system of FIG. 1 has a number of disadvantages. In the first place, it has a plurality of separate systems each of which are connected by low bandwidth connections which prevented high speed data communications which slowed the overall system operation. The foregoing network required a number of analog to digital and digital to analog converters. Users of this system could not obtain a summary of the number of textual messages and voice messages which had been answered by the telephone answering system by placing a single telephone call. Therefore, if the subscriber's answering function had been programmed to use a combination of voice and textual messages in answering the subscriber's telephone, to obtain the complete recorded messages it was necessary for a telephone call to be made to and answered by an operator at the host system 12 who would manually transfer the telephone caller to the voice mail system 14 by dialing it or if a telephone call was made first to the voice mail system, thereafter the telephone caller would dial "0" to reach on operator at the host system who would then give information pertaining to recorded textual messages. Forcing the subscriber to listen to the recorded messages in their entirety is highly disadvantageous when the subscriber has time pressures such as occur on trips away from the office. Furthermore, each of the system 12, voice mail system 14 and telephone switch 16 were controlled by separate processors which prevented an integrated operation of the system as a whole. Independent control of the parts of the system slowed down operation and further made it more difficult to program different parts of the system in that they were not under the operation of a single control program. Finally, the prior art system of FIG. 1 is expensive.

U.S. Pat. Nos. 4,612,416 and 6,464,346 disclose an integrated voice and textual message service system. The system of the aforementioned patents has an architecture in which a programmed switch interfaces with a voice mail service and a textual message center. Communications between the voice mail service and the switching network and between the message center and the switching network are by means of telephone lines. This distributed system has the same disadvantages of the prior art described above with regard to FIG. 1 in that the overall system is not controlled by a single integrated control and that system communications are based upon telephone communications.

An answering system for recording voice and textual messages based upon a Wang VS100 processor has been developed. This system is relatively expensive in that it is based upon a computing system much larger than a personal computer.

PBX systems are known which include voice mail capability. With these systems, the voice mail function is added on to the PBX architecture. PBX based systems of this type are not under the control of an integrated processor and therefore require communications over low bandwidth lines connecting the PBX system to the add on voice mail system such as telephone lines or RS232 data lines. No summary of recorded text and voice messages is available. Communications between the PBX and the voice mail system are by telephone line plus an auxiliary low bandwidth data line.

From the perspective of a person having their telephone answered by use of a telephone answering system, it is of extreme importance that the method of answering the telephone projects an extension of the person's actual telephone answering method. Thus, a telephone answering system in performing operator assisted answering services should present a telephone response to the telephone caller which is knowledgeable of the person's business whose telephone is being answered and which is highly efficient in gathering important information to be provided to the person at the time of check in telephone call to the answering system to obtain recorded messages. Furthermore, from the perspective of a telephone answering service or a private telephone switching system, it is extremely important that the operators are efficient at answering telephone calls to increase the throughput of answered telephone calls and further function to accurately record textual messages so as to maintain the highest possible degree of satisfaction with persons having the telephone answered. Additionally, voice mail systems operated should to the greatest possible extent provide telephone callers with a sense of ease in leaving a voice recorded message.

At times where the number of telephone calls being answered with operator intervention by a telephone answering service or by a private switching network is relatively high, it is of extreme importance to provide the operator with a maximum amount of information compactly displayed on the display screen associated with the operator station to permit the operator to provide a personalized operator response to all telephone callers connected to the operator including telephone callers to persons having their telephone answered as well as check-in telephone calls from persons having their telephone answered by a telephone answering system who wish to obtain messages which have been recorded as voice message or textual messages.

The assignee's EVE ® system provided operators at operator stations with a display on the display screen identifying telephone calls for persons having their telephone answered (secretarial) and check-in telephone calls to the operator from persons having their telephone answered checking in to obtain textual messages. However, this capability was limited to check-in telephone calls and secretarial telephone calls and did not identify other characteristics of telephone calls such as a check-in telephone call to an operator originating from a telephone call to obtain the subscriber's voice message to obtain a special message such as an emergency.

SUMMARY OF THE INVENTION

The present invention provides a telephone answering system having voice message recording and textual message recording controlled by a programmable controller. The operation of the parts in the telephone answering system and communications within the system are controlled by a single control program. With the invention, high data transmission rates between the controller, a voice recording system and a text recording system and the system storage which records the textual and voice messages are achieved by use of the data bus of a programmed personal computer. Usage of the data bus for transmission of data throughout the system overcomes the problem with prior art systems which utilized telephone bandwidth and/or low bandwidth data connections between distributed parts of the telephone answering system including the voice message recording system and the textual message recording system.

Furthermore, the invention provides an up-to-date summary of the number of telephone calls which have been answered by the voice message recording system and the textual message recording system of the present invention to persons using the telephone answering system to answer their telephone calls. This enables the person using the telephone answering system with a single telephone call to rapidly identify the nature of the messages which have been received by the telephone answering system and further to enable a selective retrieval of the messages by dialing an operator DTMF tone to have the recorded textual messages read by the operator and/or activating the playback of the recorded voice messages by inputting appropriate DTMF tones. This feature provides maximum flexibility to the user of the telephone answering system which is especially useful for users of the telephone answering system who have limitations on the amount of time which may be used for retrieving messages with check-in telephone calls to the telephone answering system.

Furthermore, in a situation when an emergency message has been left for a person having telephone calls answered by the telephone answering system and attempts to reach the person have failed, the system automatically transfers a check-in telephone call of the person having their telephone calls answered to an operator and displays at the operator station that the telephone call is "expected" to immediately alert the operator that an emergency message should be given to the telephone caller. This feature permits the system to quickly respond to situations requiring conveying of emergency messages.

The telephone answering system of the present invention further provides a display to operators who operate the system of characteristics of telephone calls to their operator station. This permits the operator to rapidly obtain a maximum amount of information in the shortest possible period of time which enables tailoring the precise method of answering telephone calls to the nature of the telephone call being received by the operator station. Providing the operator with characteristics of telephone calls to the operator station provides the operator with information necessary to personalize the method of answering the telephone calls received by the operator station to the nature of the telephone calls.

The present invention provides integrated voice mail and textual mail answering capability to telephone answering systems at a cost not achievable with the prior art. The present invention achieves a reduction in cost by elimination of the prior art distributed hardware which is interconnected by telephone bandwidth and/or low bandwidth data communications. Additionally, the usage of a PC to program implement system control and the voice and textual recording functions provides an integrated system at a low cost which is compatible with state of the art data processing and communications technology.

A number of programmable service options are provided to the user of the voice message recording system. The first option is that the telephone caller is permitted to immediately record a voice message in the system memory without operator intervention. The second option is that the telephone caller requests assistance of an operator prior to recording a voice message in the system memory. The foregoing two options may be provided alternatively. The at least one operator station coupled to the answering system which is operated by an operator in answering telephone calls includes a display device for displaying information in a display area of the display device stored in the system memory to be utilized by the operator in answering telephone calls to the operator station. The programmed controller decodes each telephone call to each operator station to determine a characteristic of the telephone call and causes information stored in the system memory to be displayed in the display area indicating a characteristic of the telephone call. The characteristics may include an indication that the telephone call has occurred in response to activation of playback of a voice message stored in the system memory, that the telephone call to the operator station is from a telephone caller to person having telephone calls answered by the telephone answering system, and that the telephone call is a check-in telephone call from a person having telephone calls answered by the telephone answering system in a situation when an emergency message has been taken and attempts to reach the person have been unsuccessful. The characteristic may be that the telephone call a check-in telephone call from a person having telephone calls answered by the telephone answering system.

The controller controls providing a voice summary of a number of telephone calls recorded under control of the voice recording and textual message recording systems stored in the system memory to a telephone caller when a connection of a check-in telephone call on the at least one telephone line is made to the answering system. The programmed controller controls connection of the voice summary by providing a recording requesting entry of a code, compares the entered code with codes stored in the system memory, with a separate code being assigned to each person having telephone calls answered by the telephone answering system and upon matching the entered code with a stored code causes the voice summary of the number of telephone calls to be played. The programmed controller, after controlling the providing of the voice summary, provides a recording instructing selective entry of one of a plurality of access codes which control access to messages recorded by the recording systems in the system memory, in response to an access code of the textual message recording system connects the telephone caller to an operator to permit the operator to read any stored textual messages stored in the system memory and in response to an access code of the voice recording system connects the telephone caller to a playback of the recorded voice messages stored in the system memory.

DESCRIPTION OF THE PREFERRED EMBODIMENTS

Figure 2:
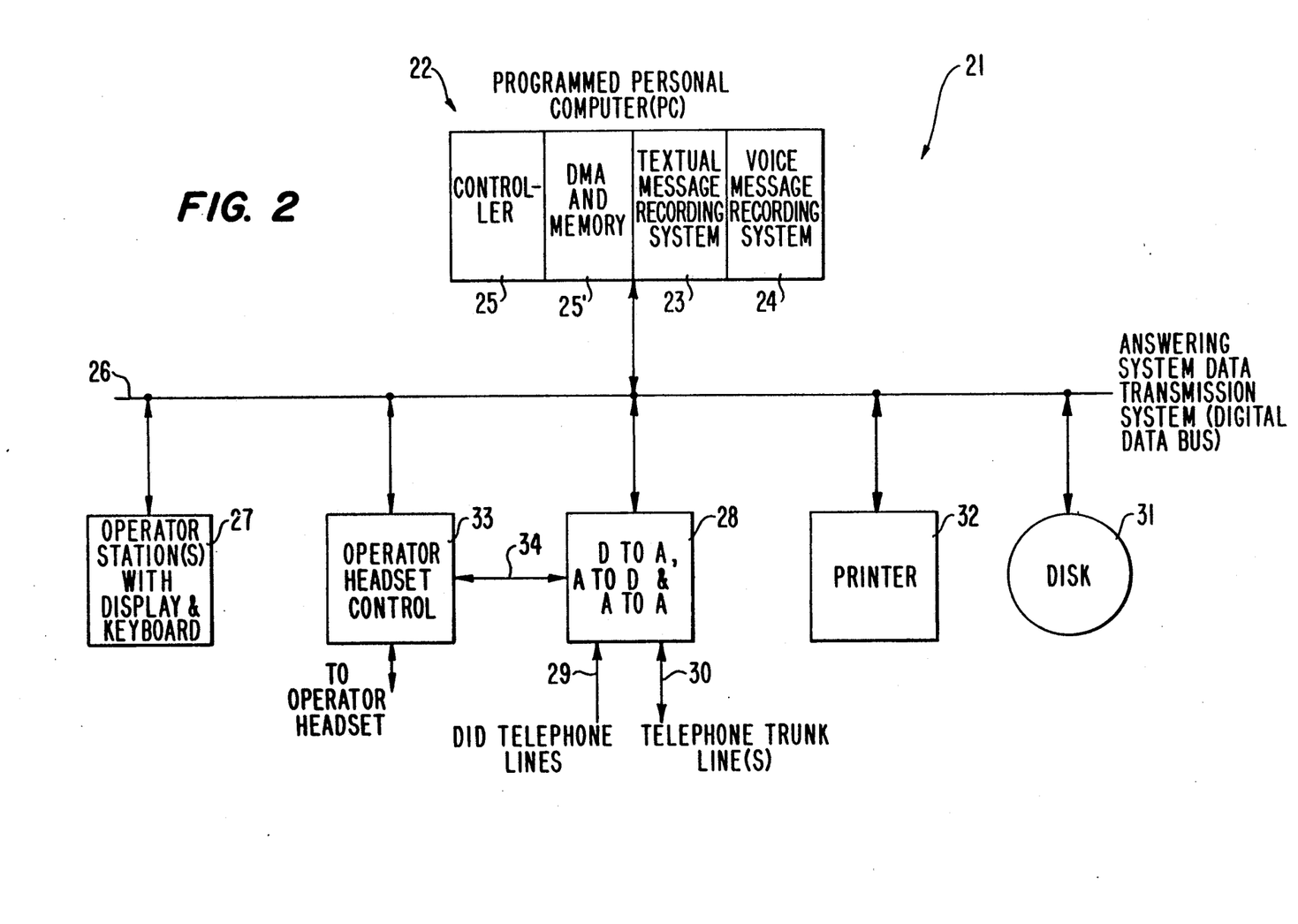
FIG. 2 illustrates a block diagram of the present invention.

FIG. 2 illustrates a block diagram of the present invention. The present invention 21 provides in a programmed personal computer 22 a textual messaging recording system 23, a voice message recording system 24 and an integrated control in the form of a programmed controller 25. The overall operation of the answering system 21 is controlled by the programmed controller 25. Preferably, the programmed personal computer is, but not limited to, an International Business Machines' PC-AT or computer compatible thereto. Furthermore, it should be understood that the present invention is not limited to an implementation in a personal computer with other computer controls being within the scope of the invention. A suitable control program implements the functions of the textual message recording system 23, voice message recording system 24 and programmed controller 25 is contained in the above-referenced appendix. The details of the program will not be described except to the extent necessary to understand the present invention.

The program set forth in the appendix is a real time multitasking program supporting multiple operators. The program supports an overall system control and the control of recording of textual and voice messages implementing the voice recording and text recording systems in the appendix are not separately identifiable. However, it should be understood that the invention is not limited to any particular method of distributing the textual message recording system 23, voice message recording system 24 and programmed controller 23 in the control program. In the preferred form of the invention, the program is executed by a personal computer.

A DMA (direct memory access) circuit and memory 25' is controlled by the programmed controller 25 to control the transmission of data throughout the system over a transmission system 26 which preferably is the parallel digital data bus of the personal computer All sources of analog data which are connected to the digital data bus are converted from analog to digital format by A to D converters. Each source data port which is connected to the digital data bus 26 addresses data to the memory in the DMA circuit and memory 25'. The programmed controller 25 then applies a destination address within the system to the data which is stored in the circuit and memory 25' for transmission to the destination. Thereafter, the DMA circuit controls the transmission of the data stored in the memory to the addressed destination data port connected to the digital data bus 26. Where necessary, the data at the addressed data port is converted to analog format by D to A converters. This form of data transmission is highly advantageous in that data transmissions between telephone input and output lines, the textual message recording system 23, the voice message recording system 24, and the operator station(s) 27 are by means of a high bandwidth digital data bus without requiring the placing of telephone calls or use of low bandwidth data communications. Suitable D to A and A to D converters in the D to A, A to D and A to A circuits 28 connect DID telephone lines 29 and telephone trunk lines 30 to the bus 26. A system storage is provided by disk 31. Printer 32 is connected to the bus 26 for providing conventional printed outputs regarding system operation. A plurality of operator stations 27 are connected to the digital data bus 26 which are operated by operators to provide operator assistance during operation of the system 21. An operator station headset control 33 is associated with each operator station 27 to permit operators at the operator stations to talk to telephone callers on the telephone lines 30 through an operator headset (not illustrated), operator headset control 33, line 34 and the analog to analog portion of the D to A, A to D and A to A circuits 28. The DID lines 29 are used conventionally to interface subscribers of a telephone answering service or a private telephone switching system with the telephone company. The at least one telephone trunk line(s) 30 couples the telephone answering system 21 to the telephone company to provide the telephone answering service with one or more check-in telephone lines to obtain an up to date summary of the telephone calls which have been answered by the telephone answering service or a telephone connection to telephone circuits outside of a private telephone switching system to enable a summary of the telephone calls answered by the telephone answering system to be obtained.

The programmed controller 25 supports at least one operator station with display and keyboard 27 with support preferably being provided for a plurality of operator stations with display and keyboard. Each operator station with display and keyboard 27 is conventional. Each operator station with display and keyboard 27 is operated with an operator which provides live operator answering capability to telephone calls requiring operator intervention as discussed below. Moreover, the control program listing contained in the above-referenced appendix supports an operation in which each telephone call to be answered by the voice message recording system 24 has an operator answer the incoming telephone call and command that the call be answered under the control of the voice message recording system if the subscriber's service option described below with reference to FIG. 5 specifies that telephone calls should be answered with the voice message recording system. Preferably, the connection of the voice message recording system 24 to the telephone caller is automatically implemented by the control program interrogating the file of persons having telephone calls answered by the telephone answering system 21 to obtain the programmed service option which, if programmed for recording of telephone calls by the voice message recording system, causes the telephone call to be recorded without operator intervention.

The disk 31 functions as the system storage for the recorded textual messages, the recorded voice messages and the control program. Furthermore, the disk 31 stores individual subscriber files of persons having telephone answering services performed by a telephone answering service utilizing the telephone answering system 21 of the present invention or a file identifying persons who have telephone calls answered by the telephone answering system of the present invention in conjunction with a private telephone switching network. These files contain pertinent information regarding each person serviced by the telephone answering system to be used by the control program of the telephone answering system 21 and operators operating the operator station(s) with display and keyboard 27. This information is described below with reference to FIG. 5. Furthermore, each subscriber file contains a security code which must be inputted to the system to the telephone answering system to obtain a summary of telephone calls answered by the telephone answering system. Furthermore, each file contains the service options to be utilized when the telephone answering system 21 is automatically answering telephone calls without operator intervention. These service options include programmable times at which telephone calls are to be answered by use of the textual message recording system 23 and the voice message recording system 24.

The programmed controller 25 jointly controls the textual message recording system 23 and the voice message recording system 24 as follows. A telephone call which has been forwarded to the telephone answering system 21 as a consequence of activating telephone call forwarding to the telephone answering system is received on the DID lines 29 or on other telephone lines. The DID lines may be used for other purposes such as when a person directly dials the telephone answering system 21. The number which is called is decoded by the programmed controller 25 in a conventional fashion. The decoded number provides a pointer to the file in memory to identify the service option to be utilized in answering the incoming telephone call. This service option is programmable as a function of time. Accordingly, after identification of the particular file, the programmed controller 25 compares the current time with the time programmed of the service options to choose the service option to be used at the time of the incoming telephone call. Thereafter, the programmed controller 25 controls the connection of the incoming telephone call to one of the operator stations with display and keyboard 27 and the textual message recording system 23 thereafter controls the recording of textual messages transmitted by an operator at an operator station with keyboard 27 to the system memory 31 for recording or the voice message recording system 24 controls the connection of the incoming telephone call to the system memory 31 for recording in accordance with the programmed service option. Transmissions of textual messages between the operator station with display and keyboard 27 and the system memory 31 for recording are transmitted over the digital data bus 26. Transmissions of voice messages between a telephone line and the system memory for recording are transmitted over the digital data bus 26. Textual messages are generated by the typing of the message on the keyboard of the operator station with display and keyboard 27. The transmission of system data on the digital data bus 26 substantially speeds up communications between the textual message recording system 23, the voice message recording system 24, programmed controller 25, and operator stations with display and keyboard 27 in comparison to the prior art which placed telephone calls or used low bandwidth communications. Furthermore, the utilization of a single control program which program implements the textual message recording system 23 and the voice message recording system 24 and programmed controller 25 provides maximum flexibility in permitting the telephone answering system 21 of the present invention to be configured to the needs of different environments such as telephone answering services and private telephone switching networks.

FIG. 3 illustrates a block diagram 100 of a preferred embodiment of the present invention. The preferred embodiment 100 executes the control program listed in the above-referenced appendix. It should be understood that the textual message recording system 23, voice mail recording system 24, program controller 25 and transmission system 26 have been omitted for the reason that these elements are implemented within the programmed host system 102 described above with reference to FIG. 3. The AT compatible computer includes a clock calendar. A pair of serial ports 104 respectively couple the host system 102 to the system modem 106 and to system printer 108. The serial ports 104 are standard serial ports used with the International Business Systems' AT computers. An interface 110 provides an interface between the host system 102 and the operator stations 112.

The interface 110 is connected to a remote input/output panel 114 having eight ports 116. Ports 1-3 are respectively connected to the second, third and fourth operator stations 112 to transmit data to the PC compatible computer and display contained in each of the operator stations. Ports 4-8 are connected to modems and other outputs as indicated by 118, such as a remote printer, alpha paging or a PBX interface to a PBX system having a serial port. The interface 110 is an 8 port serial input/output board marketed by Forth Inc. of Manhattan Beach, Calif., as part number FB-ACL 8-2(H). The interface 110 is an intelligent input/output processor designed to implement different serial protocols. Handling of serial protocols by the interface 110 off loads processing overhead from the host system 102 which frees the host system for performing other tasks. Data compression capability may be implemented in the host system 102 or in the interface 110 as a consequence of the interface having an 8088 microprocessor.

Four identical voice processing boards 120 (voice processors) provide a telephony interface of the host system 102 with the telephone network. The voice processors 120 provide four loop start telephone lines 121. Viewed from the telephone company, the voice processors 120 have the characteristics of a telephone. The voice processors 120 implement normal functions such as ring detection, software controlled answering, DTMF and dial pulse output and detection capabilities. Furthermore, the voice processors 120 digitize incoming speech for storage on the system disk as well as playing back of previously stored data. The voice processors 120 contain firmware to compress digital data. Furthermore, the voice processors 120 have dual ported RAM to enable data to be transferred to the host computer. The voice processors 120 detect whether the telephone lines to which they are coupled are ringing, busy and off hook. The voice processors 120 are programmable to listen to tones if a frequency is specified. The voice processors 120 have audio outputs for a line which may be connected to an appropriate interface such as switch matrices 122 which are discussed below to allow an incoming telephone caller to talk to a live operator. An 80186 microprocessor is contained in each of the voice processors 120 to handle control functions. The computer in the host system 102 contains software to communicate with the microprocessor of the voice processors 120 and control all of the required telephony functions. For DID telephone lines, a ring back cadence is provided from the hard disk 31 on all incoming DID telephone calls. Furthermore, the voice processors 120 provide busy signals, messages if a wrong number comes in, automated answering for persons who have voice mail, recording and playback of messages, automatic dial out so that an operator can be processing another telephone call while a first telephone call is being dialed and DTMF decoding for automated voice mail functions. Optional DID interfaces 124 permit the loop start lines 121 to be connected to DID trunks 126. The voice processors 120 may be a D/41 board manufactured by Dialogic Corporation of Parsippany, N.J.

The switch matrices 122 provide an operator audio interface to incoming telephone calls. Moreover, the switch matrices 122 are used for operator input to voice mail. Each of the switching matrices 122 contain an 8×8 analog crosspoint switch which allows any one of eight lines from the voice processors 120 to be connected to DID trunks 126. The switch matrices 122 are connected to a station adaptor 128 having 8 output lines 129. In order to permit patching of two telephone calls together, the number of lines 129 connected to operator stations has been limited to four. Lines 1-4 of the station adaptor are connected to the remote operator stations 112 and to the operator station 130 which is directly supported by the host system 102. Lines 5-8 of the lines 129 of the station adaptor 128 are used for patching together of two telephone calls with the capability of the operator being able to interrupt the patched telephone calls. The switching matrices are a Dialogic Corporation AMX/81 boards.

Figure 4:
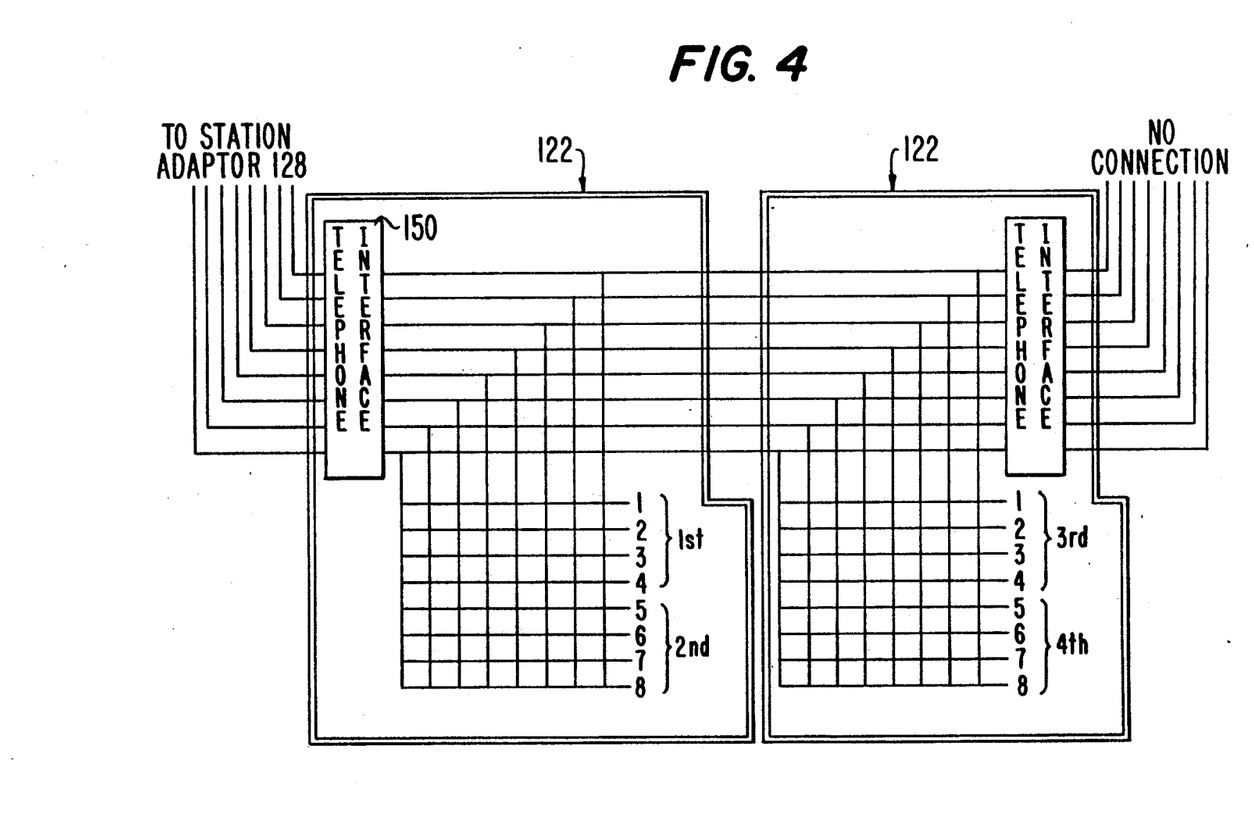
FIG. 4 illustrates an interconnection of the switch matrices of FIG. 3.

FIG. 4 illustrates the interconnection of the switch matrices 122 of FIG. 3. Like reference numerals identify like parts in FIGS. 3 and 4. The bracketed lines "1st, 2nd, 3rd, and 4th" respectively indicate connections to the first, second, third and fourth voice processors 120 described above in FIG. 3. The telephone interface 150 is used to connect operators at the operator stations to the voice processors 120 described above. Thus, if a telephone call comes in on one of the lines form the telephone company to a voice processor 120, one of the cross points on the right-hand switching matrix is closed and the signal is transmitted to the left-hand switching matrix. The signal is transmitted through the telephone interface 150 to the operator. The combined effect of the switching matrices 122 is that they jointly function as a single 16×8 crossover matrix. At the present time, the right-hand telephone interface is not utilized.

Figure 5:
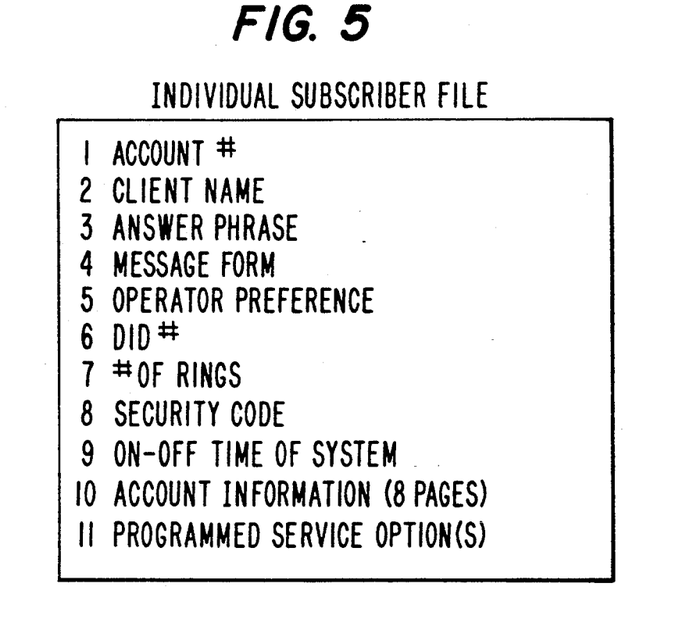
FIG. 5 illustrates an individual file which is stored in the main memory of the present invention.

FIG. 5 illustrates a memory map of data contained in an individual person's file which is stored in the system memory storage disk 31 of the answering system 21. It should be understood that the terminology "person" as used in describing the invention is intended to identify all persons who are serviced by usage of the present invention including, but not limited to, subscribers of a conventional telephone answering service as well as persons who have telephones associated with private telephone switches such as PBX switches. As described below, the information contained in the individual file illustrated in FIG. 5 is that which may be utilized by a telephone answering system in accordance with the present invention being used by a telephone answering service. Suitable modifications may be made to this information to service persons whose telephones are answered by private telephone switches or other applications. The "account #" identifies the number assigned to the person's account. This number is utilized for purposes of billing and account identification. The "client name" is the name of the person whose telephone is being answered. The "answer phrase" is the phrase which is desired by the person to be used when the operator answers a telephone call for purposes of greeting the telephone caller in the appropriate manner. The "message form" is a form having one or more blanks in which information provided by the telephone caller is filled in to create a complete message which is read back to the person upon telephone call in on a check in line. The "operator preference" is programmable to automatically cause a certain operator station(s) to be called when a telephone call is incoming for the person. The operator preference permits operator stations to be listed to be eligible for telephone calls according to required or preferred telephone call eligibility groups or stations. The "operator preference" permits the person to have a particular operator to be utilized for answering the person's telephones. The "DID #" is the digits assigned to the person for telephone calls incoming on a block of DID lines 29 when the answering service has been activated to answer the person's telephone. The "DID #" may be three or four digits out of the block of digits provided in a DID trunk by the telephone company. The programmed controller 25 operates to decode the DID digits of an incoming telephone call for a person and utilizes those digits as a pointer to identify the individual file. Accordingly, the DID number functions as an address of pertinent information utilized for automatic operation of the telephone answering system in accordance with the invention such as when the person desires for telephone messages to be left by operation of the voice message recording system 24 without line operator intervention. The "# of rings" is a programmable variable which is the maximum number of times a person's telephone should ring before the answering service answers with an operator or to request a voice message generated by the voice message recording system 24. The "security code" functions as a password for screening incoming telephone calls s that only persons who desire to obtain a summary of messages recorded under the control of the textual message recording system 23 and the voice message recording system 24 in the system memory 31 are available to only the person.

The telephone answering system 21 of the present invention answers each check in telephone call by providing a voice message to the telephone caller to input their security code. The programmed controller 25 then decodes the DTMF tones and determines if a match between the inputted code and a stored person's code exists to permit the person to have access to the automatic check in. Assuming that the telephone caller enters a valid security code, the programmed controller 25 thereafter causes a voice synthesized message to be played to the telephone caller: "You have _ secretarial messages and _ voice messages" with the information provided in blanks being dynamically stored in the system memory 31 to reflect the current count of messages which have been recorded under the control of the textual message recording system 23 and the voice message recording system 24 at the time of the check in from the telephone caller. The blanks are filled in by a synthesized voice which dynamically changes as the number of telephone calls changes. The "on-off time of system" is the programmed time at which the telephone answering system is to be operative to answer telephone calls of the subscriber.

The "account information" is up to eight pages of pertinent information pertaining to the person for the benefit of the answering service. For example, the account information may include information regarding telephone calls of differing types which require the operator to be able to tailor information to the type of telephone call being received.

The "programmed service option(s)" includes an identification of the times at which telephone calls are to be answered by the telephone answering system 21 under the control of the textual message recording system 23 and the voice message recording system 24. The telephone answering system 21 has the capability of answering telephone calls to persons having telephone calls answered under the control of the textual message recording system 23 and the voice message recording system 24 at different times during the day to permit the person to select the precise method of answering telephone calls as a function of time.

An important part of the present invention is the automatic check in which permits the person to obtain the above-described numerical summary of the telephone calls which have been answered by the textual message recording system 23 and the voice message recording system 24. The use of the automatic check in by the person is described as follows. The person is required to know three things which are a telephone number to place a check in telephone call, the person's security code as described above, and that the check-in telephone call must be placed from a telephone with DTMF capability. The check-in telephone number may be any DID number or any ringing incoming business trunk. The DID number(s) and/or business trunks are assigned for use in check-in at the time of the set up of the telephone answering system of the present invention. All persons may share the same number. All telephone calls to the check-in number(s) are given a voice recording requesting entry of the security code and subsequent menu described below.

The complete security code consists of 4–8 digits terminated by the telephone # key. The last four digits are the "account number" described above. The first four digits are programmed at the person's service set up and may be any 0–4 digit combination of 0–9. The * telephone key and the # telephone key may not be used. The first four digits are the security portion of the security code. The security portion of the security code may be changed at any time and does not have to be different for every person. The security portion of the security code may be four digits from a birth date or social security or office extension number. For example, if the account number is 123 and the security portion is 426, the person enters 4260123# in response to the telephone answering system 21 of the present invention requesting entry of the security code. The telephone answering system 21 of the present invention uses voice messages through the remainder of the check-in procedure. As the person becomes familiar with the dialogue, the person does not have to wait for voice instructions with it being possible for digits to be entered to execute a command or skip the menu. If the person's telephone keys have a standard alphabetic imprint, the commands for playing, discarding and keeping messages have the mnemonics P, D and K.

When the invention utilizes the computer control program contained in the above-referenced appendix, a check-in telephone call must be placed from a telephone which sends DTMF tones. Alternatively if a person telephone calls from a telephone which does not have DTMF tone generating capability, the person must stay on the telephone until an operator answers the check in telephone call at which time the person may be manually referred to the summary described above of the number of telephone calls answered by the telephone answering system in response to an operator action.

The following describes one acceptable sequence for entering the security code. The telephone answering system of the invention answers the check in telephone call by saying "Thank you for calling. Please enter your pass code or wait. Press the number key (#) to end your entry". If the telephone caller enters a valid security code, the telephone answering system states "Thank you for checking in." If the telephone caller enters an invalid security code, the telephone answering system states "That number was not received correctly. Please try again or wait." If the telephone caller again enters a security code incorrectly, the telephone answering system states "That number was not received correctly. You are being transferred to a secretary for assistance. Please stay on the line." and the telephone call is placed into distribution for answering by an operator at an operator station.

The present invention permits an operator to be waiting for a check-in telephone call such as when a telephone message has been given that an emergency exists and attempts to reach the person have been unsuccessful. In this circumstance, the telephone answering system states to the telephone caller "We are waiting for your telephone call. Please stand by."

Upon entry of a valid security code and playback to the telephone caller of the number of secretarial messages and voice messages as described above, the following choices exist to the telephone caller which are provided by the following voice message: "Press 7 to play the first message, (if there are voice messages), 0 to reach your telephone secretary, 9 to disconnect if you're checking out, 2 if you can be reached at another number, 4 if you're on pager, 6 if you're off pager, and 8 if you're checking in." The inputted numbers "0" and "7" function as access codes respectively for obtaining textual messages recorded under the control of the textual message recording system 23 and voice messages recorded under the control of the voice message recording system 24. If the telephone caller does nothing for three seconds, the above sequence is recited again. It should be noted that the option of playing back voice recorded messages is automatically not provided if there are no voice messages in storage in the system memory 31 for the person who is calling.

If one or more voice messages are stored by the voice message recording system 24 and the person enters the number 7 as described above, the following voice messages are provided after the first recorded voice message is played back by the voice message recording system: "End of message. Press 3 to discard this message and play the next, 5 to keep it and play the next, 7 to play the current message, 0 to reach your telephone secretary and 9 to disconnect. Press the # key when finished." To scroll through and pick up all messages, the person would successively press 3 and 7. As described above, if letters are on the dialing keys, 3 is to discard, 5 is to keep and 7 is to play. Entry of 3 is confirmed with the voice message "Message discarded" and makes the next message the current message. Entry of 5 is confirmed with "Message kept" and makes the next message the current message. If 3 or 5 is used on a message, entry of 7 will play the next message. Otherwise, the telephone answering system will replay a message. Entry of 0 causes an operator station to be dialed which initiates the usual behavior of the operator in answering a check-in telephone call. Nine (9) disconnects the person. Entry of the # sign plays the main check in menu described above. Entry of any other digit(s) produces an illegal numbered behavior. Each message which is played is followed by the voice message "end of message". When the last message is played, the telephone answering system states "You have no unplayed messages" and repeats the main check-in menu described above.

The control program may be modified so that when a person wishes to activate the telephone answering system by initiating telephone call forwarding, the subscriber may check-in at the time that telephone call forwarding has been activated without operator assistance by dialing the # key during the first ring.

Figure 6:
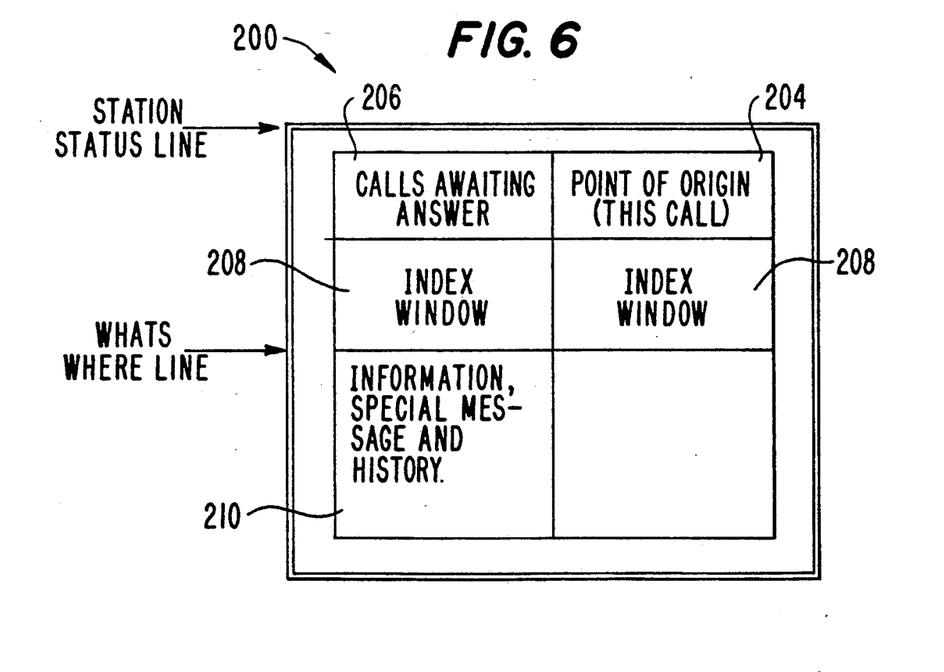
FIG. 6 illustrates the format of the display used by an operator station of the present invention.

FIG. 6 illustrates a display screen 200 utilized by the operator stations of the present invention in answering telephone calls. The screen 200 is organized into six blocks described as follows. The first block 204 plays an important part in the present invention's ability to facilitate an operator answering telephone calls with the highest possible degree of information individualized for the particular needs of each subscriber. Block 204 under the control of the control program provides the operator with one or more characteristics pertaining to a current telephone call providing information of the current telephone call to the operator station. The characteristic(s) provided in block 204 inform the operator at an operator station prior to making a connection of information utilized by the operator to compose a voice sequence in answering the telephone call which is tailored to the precise nature of the telephone call. This characteristic of block 204 may generally be referred to "point of origin" information pertaining to a current telephone call but it should be understood that the characteristics to be displayed in block 204 ar not limited to "point of origin" information. In order to provide the maximum possible personalization of answering of a person's telephone call in a manner which reflects an extension of the person's own practices of answering the telephone, it is desirable to provide the operator with information pertaining to the origin of the telephone call such as if the person has initiated obtaining a playback of voice recorded telephone calls. For example, an operator's response in answering a telephone call placed to the operator station from the person that originates after connection to the voice message recording system to obtain the voice messages recorded in the system storage 31 is usually a request to the operator for a special message such as an emergency and need not be particularized to reflect how the person wishes its telephone to be answered for a telephone call being placed to the person. Alternatively, when a telephone call is placed to the operator station requiring the operator to answer the person's telephone in a manner in which the person would answer its own phone, it is highly desirable to have the operator utilize the answer phrase as described above with reference to FIG. 5 which would be of no benefit for a check in telephone call. Moreover, from the standpoint of operator efficiency, certainty in the operator's mind regarding the precise sequence to be utilized for answering all telephone calls to the operator station is greatly facilitated by the operator knowing the characteristics of all of the telephone calls to the operator station such as their point of origin from a person obtaining recorded voice messages. With the present invention's capability of permitting automatic check-in to obtain voice messages recorded under the control of the voice message recording system 24, as well as permitting connection to the operator when check-in telephone calls are received from the person, the characteristic(s) displayed in block 204 provides the operator with a maximum sense of how each telephone call to the operator station should be answered as a function of where and how it originated. The characteristic information displayed in block 204 also informs the operator if the telephone call is from two telephone calls which have been connected together as described above with reference to the lines 5-8 of the station adaptor 128 illustrated in FIG. 4. Furthermore, the characteristic informs the operator if a person has called to obtain a summary of recorded messages in a circumstance when an emergency message has been left and attempts to reach the person have been unsuccessful. Providing of emergency messages to persons is of paramount importance for users of a telephone answering system.

Examples of characteristics are as follows. "From voice" indicates that the telephone caller dialed the "O" operator key from the playback of voice messages recorded by the textual message recording system 24. "From PTCH" indicates that the telephone caller dialed the "O" operator key from two telephone calls which had been patched together by the telephone answering system 21. "Expected" indicates that the telephone call is from a person having telephone calls answered by the telephone answering system 21 in an emergency situation where attempts to reach the person have failed or that the telephone call is one to which a patch is to be made.

The station status line indicates the station and system traffic status including the station number, whether it is on or off, the first name of the operator operating the station, the number of telephone calls which are waiting to be answered (waits), an events indication indicating if a system warning message has been printed on the printer 32, and the current date and time. The number of "waits" is the number of waiting telephone calls not on another operator screen which the operator at the operator station is eligible to answer. If two operators are eligible for a waiting telephone call, both screens will show the telephone call as a wait.

Block 206 summarizes the three most current telephone calls which await answer. If the operator is a trainee or the telephone answering system is programmed for one telephone call at a time, one telephone call will show. The telephone call being answered is highlighted with the answering information regarding the point of origin block 204 described above. Block 206 displays traffic window detail such as if the current telephone call is ringing, a talking connection exists, the telephone call is on hold or it is a conference telephone call, the number of rings, is the telephone call a check-in telephone call, the account number and the account name.

The windows 208 provide an index to enable the operator to quickly identify pertinent information contained in block 210 described below. Status detail is automatically applied and highlighted at the beginning of an index line with the statuses of "urgent" indicating an urgent message, "delivered" indicating a delivered message, "voice" indicating an unplayed voice message is attached, "played" indicating that a played voice message is attached and "delivered special" indicating that a special message has been delivered.

The "what's where line" identifies the contents of the index windows 208 above and the information 210 below. This line is primarily used as a training key.

Furthermore, in accordance with the present invention, unlike the prior art, information in the index windows is keyed to reflect certain information regarding the characteristics of block 204 described above. A "ZERO" displayed as the state of the telephone call means that the telephone call has arrived because a telephone caller dialed O while in a playback of stored voice message to request an operator. A "O" telephone call has not been answered by an operator. "PTCH" means that the telephone call is patched and that the operator is not involved. "TK-1" means that the operator is talking to the first party in a two party telephone call. "TK-2" means the operator is talking to the second party in a two party telephone call. "DISC" means that the telephone call has been disconnected.

Block 210 is information obtained from 8 pages of account information described above. This information may be varied by the operator. Special information is temporary information which is stored in a blank page having twelve 38 character lines. The "message" is one of 200 user created selectable message forms each having twelve 38 character lines. The history is information associated with each message and special. The history lists actions taken to deliver the message. The first eleven lines show the first eleven actions and the last line is overwritten to show the latest of more than twelve actions. The history actions are reflective of the history of the person's account regarding the taking of message by the answering system of the present invention.

While the invention has been described in terms of its preferred embodiments, it should be understood that numerous modifications may be made to the present invention without departing from the spirit and scope of the invention as defined in the appended claims. It is intended that all such modifications fall within the scope of the appended claims.

We claim:

1. A telephone answering system for providing textural messages produced from operators answering telephone calls received by the answering system and voice messages produced by the answering of telephone calls received by the telephone answering system comprising:

at least one operator station which is operated by an operator in answering telephone calls, an operator station including a display device for displaying information to be utilized by the operator in answering telephone calls at the operator station and a textual message generating device used by the operator during answering telephone calls for composing textual messages recording information from telephone calls answered by the operator;

a voice message recording system for recording the voice messages, from telephone calls answered by the answering system, in a memory of the answering system;

a textual message recording system for recording the textual messages, composed by an operator using the textual message generating device at one of the at least one operator station in answering a telephone call, in the memory of the answering system; and a programmed controller for controlling the voice message recording system and the textual message recording system under the control of programming stored in the memory of the answering system, the programmed controller determining telephone number digits of each telephone call received by the answering system to be answered by the answering system, the digits being used by the controller to identify stored information, the stored information being used for controlling whether the received telephone call is to be answered either by the voice message recording system which records information from the answered telephone call in the memory of the answering system or by an operator at one of the at least one operator station who utilizes the information displayed on the display device obtained from the stored information to answer the received telephone call and who composes a textual message from answering the received telephone call which is recorded by the textual message recording system in the memory of the answering system, and controlling the reproduction of messages recorded by the recording system.

2. A telephone answering system in accordance with claim 1 wherein:

the programmed controller is a programmed computer.

3. A telephone answering system in accordance with claim 2 wherein:

the programmed computer is a personal computer.

4. A telephone answering system in accordance with claim 1 wherein:

the programming is a single control program.

5. A telephone answering system in accordance with claim 2 wherein:

the programming is a single control program.

6. A telephone answering system in accordance with claim 3 wherein:

the programming is a single control program.

7. A telephone answering system in accordance with claim 1 wherein:

the memory of the answering system is a disk storing the recorded textual messages, the recorded voice messages and the programming of the programmed controller.

8. A telephone answering system in accordance with claim 2 wherein:

the memory of the answering system is a disk storing the recorded textual messages, the recorded disk messages and the programming of the computer.

9. A telephone answering system in accordance with claim 3 wherein:

the memory of the answering system is a disk storing the recorded textual messages, the recorded voice messages and the programming of the personal computer.

10. A telephone answering system in accordance with claim 4 wherein:

the memory of the answering system is a disk storing the recorded textual messages, the recorded voice messages and the single control program.

11. A telephone answering system in accordance with claim 5 wherein:

the memory of the answering system is a disk storing the recorded textual messages, the recorded voice messages and the single control program.

12. A telephone answering system in accordance with claim 6 wherein:

the memory of the answering system is a disk storing the recorded textual messages, the recorded voice messages and the single control program.

13. A telephone answering system in accordance with claim 1 wherein:

the voice message recording system converts the information from a telephone call answered by the answering system into a digital voice message;

the textual message recording system under control of an operator composes the textual message into a digital textual message; and wherein the digital textual messages are transmitted from the at least one operator station to the memory of the answering system under control of the textual message recording system and the digital voice messages are transmitted from the voice message recording system to the memory of the answering system under control of the voice message recording system utilizing a digital data bus, a reproduced digital textual message is transmitted under control of the textual message recording system from the memory of the answering system using the digital data bus to an operator station for display by the display device of the operator station to which the digital textual message is transmitted, and reproduced digital voice messages are transmitted from the memory of the answering system using the digital data bus to the voice message recording system where the reproduced digital messages are converted into analog form and reproduced.

14. A telephone answering system in accordance with claim 4 wherein:

the voice message recording system converts the information from a telephone call answered by the answering system into a digital voice message;

the textual message recording system under control of an operator composes the textual message into digital textual message; and wherein the digital textual messages are transmitted from the at least one operator station to the memory of the answering control under control of the textual message recording system and the digital voice messages are transmitted from the voice message recording system to the memory of the answering system under control of the voice message recording system utilizing a digital data bus, a reproduced digital textual message is transmitted under control of the textual message recording system from the memory of the answering system using the digital data bus to an operator station for display by the display device of the operator station to which the digital voice messages are transmitted from the memory of the answering system using the digital data bus to the voice message recording system where the reproduced digital messages are converted into analog form and reproduced.

15. A telephone answering system in accordance with claim 7 wherein:

the voice message recording system converts the information from a telephone call answered by the answering system into a digital voice message;

the textual message recording system under control of an operator composes the textual message into digital textual message; and wherein the digital textual messages are transmitted from the at least one operator station to the memory of the answering system under control of the textual message recording system and the digital voice messages are transmitted from the voice message recording system to the memory of the answering system under control of the voice message recording system utilizing a digital data bus, a reproduced digital textual message is transmitted under control of the textual message recording system from the memory of the answering system using the digital data bus to an operator station for display by the display device of the operator station to which the digital textual message is transmitted, and reproduced digital voice messages are transmitted from the memory of the answering system using the digital data bus to the voice message recording system where the reproduced digital messages are converted into analog form and reproduced.

16. A telephone answering system in accordance with claim 8 wherein:
the voice message recording system converts the information from a telephone call answered by the answering system into a digital voice message;
the textual message recording system under control of an operator composes the textual message into digital textual message; and wherein
the digital textual messages are transmitted from the at least one operator station to the memory of the answering system under control of the textual message recording system and the digital voice messages are transmitted from the voice message recording system to the memory of the answering system under control of the voice message recording system utilizing a digital data bus, a reproduced digital textual message is transmitted under control of the textual message recording system from the memory of the answering system using the digital data bus to an operator station for display by the display device of the operator station to which the digital textual message is transmitted, and reproduced digital voice messages are transmitted from the memory of the answering system using the digital data bus to the voice message recording system where the reproduced digital messages are converted into analog form and reproduced.

17. A telephone answering system in accordance with claim 9 wherein:
the voice message recording system converts the information from a telephone call answered by the answering system into a digital voice message;
the textual message recording system composes the textual information into digital textual message; and wherein
the digital textual messages are transmitted from the at least one operator station to the memory of the answering system under control of the textual message recording system and the digital voice messages are transmitted from the voice message recording system to the memory of the answering system under control of the voice message recording system utilizing a digital data bus, a reproduced digital textual message is transmitted under control of the textual message recording system from the memory of the answering system using the digital data bus to an operator station for display by the display device of the operator station to which the digital textual message is transmitted, and reproduced digital voice messages are transmitted from the memory of the answering system using the digital data bus to the voice message recording system where the reproduced digital messages are converted into analog form and reproduced.

18. A telephone answering system in accordance with claim 1 wherein:
the programmed information stored in the memory of the answering system comprises a file of information containing digits identifying a DID line of the answering service on which the received telephone call is received by the answering system and a programmed service option specifying whether the textual message recording system or the voice message recording system is used to answer calls received on the identified DID line.

19. A telephone answering system for providing textual messages from operators answering telephone calls received by the answering system and voice messages produced by the answering of telephone calls received by the telephone answering system comprising:
at least one operator station which is operated by an operator in answering telephone calls, an operator station including a display device for displaying information to be utilized by the operator in answering telephone calls at the operator station and a textual message generating device used by the operator during answering telephone calls for composing textual messages recording information from telephone calls answered by the operator;
a voice message recording system for recording the voice messages, from telephone calls answered by the telephone answering system, in a memory of the answering system;
a textual message recording system for recording the textual messages, composed by an operator using the textual message generating device at the at least one operator station in answering telephone calls, in the memory of the telephone answering system; and
a controller controlling the voice message recording system and the textual message recording system under the control of a single control program stored in the memory of the answering system, the controller determining telephone number digits of each telephone call received by the answering system to be answered by the answering system, the digits being used to identify stored information, the stored information being used by the controller for controlling whether the received telephone call is to be answered either by the voice message recording system which records information from the answered telephone call in the memory of the answering system or by an operator at one of the at least one operator system who utilizes the information displayed on the display device obtained from the stored information to answer the received telephone call and who composes a textual message from answering the received telephone call which is recorded by the textual message recording system in the memory of the answering system, and controlling the reproduction of messages recorded by the recording systems by either an operator reading a recorded textual message or an audio reproduction of the recorded voice message.

* * * * *